United States Patent [19]
Ma

[11] Patent Number: 5,222,603
[45] Date of Patent: Jun. 29, 1993

[54] ROLL TOP WALL FOR CONTAINERS SUCH AS PLANTERS

[76] Inventor: Mark Ma, 1415 Martens Dr., Hammond, La. 70401

[21] Appl. No.: 830,064

[22] Filed: Feb. 3, 1992

[51] Int. Cl.$^5$ .......................... A01G 9/02; B65D 85/50
[52] U.S. Cl. ...................................... 206/423; 47/66; 217/1; 217/122
[58] Field of Search .................. 47/66, 67, 72, 84; 206/423, 457, 524.2; 217/1, 11, 51, 122; 220/460, 463, 9.1–9.3

[56] References Cited

U.S. PATENT DOCUMENTS

| | | | |
|---|---|---|---|
| 396,459 | 1/1889 | Bertrand | 47/66 |
| 414,585 | 11/1889 | Repelovski | 217/1 |
| 470,567 | 3/1892 | Hitch | 217/11 |
| 716,668 | 12/1902 | Cheney | 47/66 |
| 2,630,934 | 3/1953 | Elmendorf | 217/1 |
| 5,018,300 | 5/1991 | Chiu et al. | 47/72 |
| 5,033,232 | 7/1991 | Vaughn | 47/66 |
| 5,070,645 | 12/1991 | Vaughn | 47/66 |

Primary Examiner—Jimmy G. Foster
Attorney, Agent, or Firm—Pravel, Hewitt, Kimball, & Krieger

[57] ABSTRACT

A system for the assembling of a container such as a planter, which comprises a frame portion which can be assembled through the inter-connection of individual components into a desired shape such as a circle, triangle, or rectangle; a wall portion attachable to the outside of the frame, after the frame has been assembled, with the wall portion further including a plurality of wooden slats adhered to the back face of a flexible material, with the slats positioned adjacent one another in parallel relation, so that the second face of the material can be adhered to the outside of the frame, and after the material has encircled the frame, the slats on the outer face of the material serves as a decorative exterior wall of the container such as a planter which would encircle the entire container such as a planter.

7 Claims, 2 Drawing Sheets

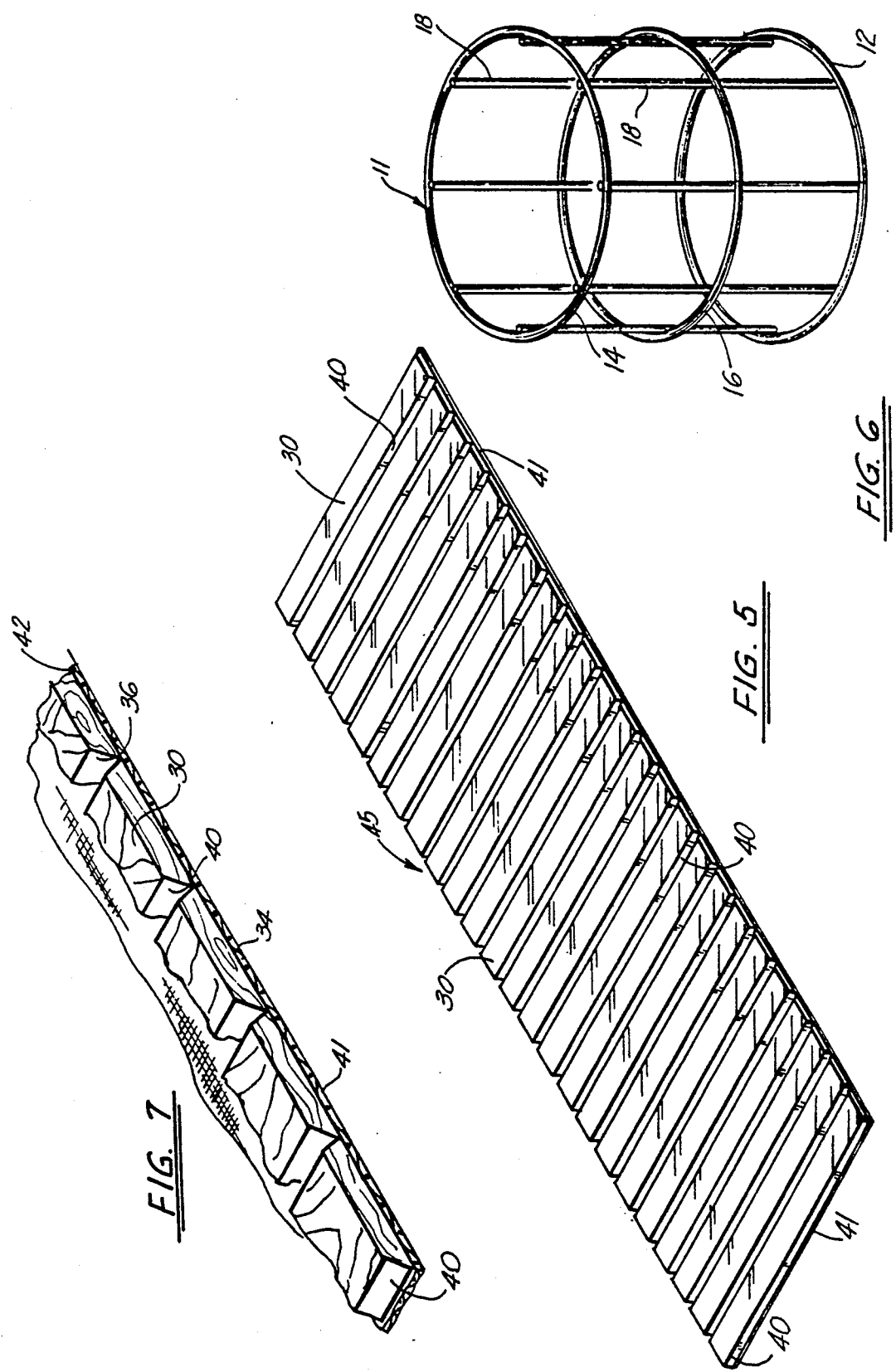

ROLL TOP WALL FOR CONTAINERS SUCH AS PLANTERS

BACKGROUND OF THE INVENTION

1. Field Of The Invention

The apparatus of the present invention relates to containers such as planters. More particularly, the present invention relates to a novel material for utilizing on walls of containers such as planters, to configure various shapes and sizes in the assemblage thereof.

2. General Background

Planters, which are utilized for housing both in-door and out-door plants, often appear in many decorative styles and configurations depending on the need and wants of the plant owner. In most cases, a consumer is restricted in the size and shape of containers such as planters that they are able to obtain, and the type of material that is used on the outside of the container such as a planter since most containers are sold on an already assembled basis. It would, therefore, be beneficial to make available a container such as a planter which can be assembled by the consumer, and despite the configuration of the container such as a planter, a certain type of material can be utilized for the wall of the container such as a planter, whether the container such as a planter be circular, rectangular, triangular in shape, or the like.

Although it is foreseen that the principal area of use would be for containers such as planters, it is foreseen that the construction of such a wall for a container such as a planter may be utilized in other types of containers such as toy-boxes or the like, which may be utilized in various fashions, but would adhere to the same principals as will be discussed herein.

SUMMARY OF THE PRESENT INVENTION

The present invention solves the problems in a simple and straightforward manner. What is provided is a system for the assembling of a container such as a planter, which comprises a frame portion which can be assembled through the inter-connection of individual components into a desired shape such as a circle, triangle, or rectangle; a wall portion attachable to the outside of the frame, after the frame has been assembled, with the wall portion further including a plurality of wooden slats adhered to the back face of a flexible material, with the slats positioned adjacent one another in parallel relation, so that the second face of the material can be adhered to the outside of the frame, and after the material has encircled the frame, the slats on the outer face of the material serves as a decorative exterior wall of the container such as a planter which would encircle the entire container such as a planter.

Therefore, it is the principal object of the present invention to provide an assembly for a container such as a planter, which can be assembled through the interconnection of individual frame members, for form a desired configuration;

It is a further object of the present invention to provide a wall portion that can be easily adhered to the frame portion, after the frame portion has been fully constructed;

It is a further object of the present invention to provide a container assembly which can be assembled into desired shapes such as a circular container such as a planter, a triangular shaped container such as a planter, rectangular container such as a planter, or the like; and It is a further object of the present invention to provide a container assembly, such as a planter, which utilizes a wall portion that can be placed on the container such as a planter frame, the wall portion including a decorative outer covering which is configured so as to allow the outer covering to extend over the various shapes of containers desired.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 5 illustrates an overall view of the exterior wall layout utilizing the present invention;

FIG. 6 illustrates an overall view of a circular frame portion of the present invention; and FIG. 7 illustrates a detailed view of a portion of the wall portion as illustrated in FIG. 5.

DETAILED DESCRIPTION OF THE PREFERRED EMBODIMENT

Figure 1:
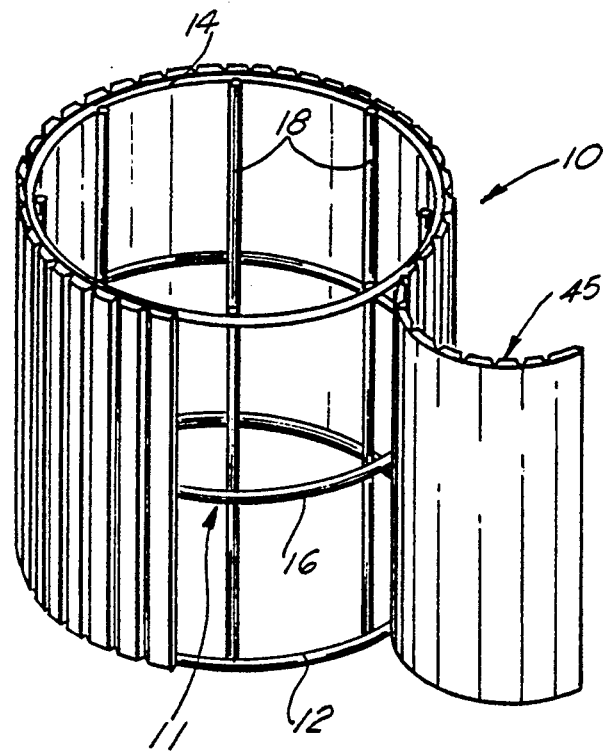
FIG. 1 illustrates an overall view of a circular container such as a planter, with a portion of the wall portion extending away from the frame.
Figure 2:
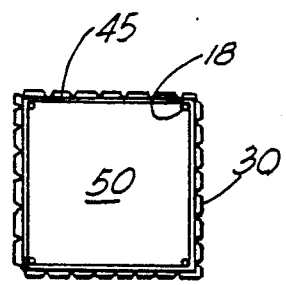
FIG. 2 illustrates a top view of a fully constructed square container such as a planter utilizing the present invention.

FIGS. 1 through 7 illustrate the preferred embodiment of the apparatus of the present invention by the numeral 10. As illustrated in the Figures, apparatus 10 would comprise a novel container such as a planter assemblage comprising basically two major components. As illustrated in FIGS. 1 and 2, the first major component would comprise a frame portion of the container, which, as seen in FIG. 2 is illustrated in representative configuration in a circular pattern. As illustrated, the frame portion would comprise a first circular base portion 12, a top circular portion 14, and an intermediate circular portion 16, each of the circular portions spaced apart via a plurality of parallel vertically extending support members 18, which in the preferred embodiment would be equally spaced apart to form the configured circular frame as illustrated in FIG. 1. In the preferred embodiment, the frame could be held together through screws and nuts or the like, so as to construct a frame that could stand on the end portion in the upright position as illustrated.

Figure 3:
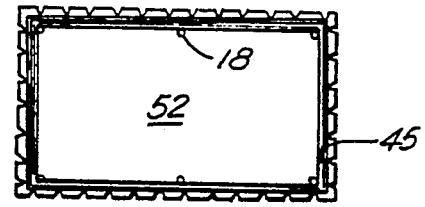
FIG. 3 illustrates a top view of a rectangular container such as a planter utilizing the present invention.

Turning now to FIG. 2, there is illustrated the second major component of the apparatus which would comprise an extended wall layer which would be positionable around the outer edge of the frame portion (as illustrated in FIG. 3). The extended wall portion as seen in FIG. 2 and in detailed view in FIG. 3, would comprise a plurality of slats 30, constructed preferably of wood, each of the slats having a specific base width 34, a specific thickness 36, and a specific upper width 38, with the outer width as illustrated being slightly less than the base width so that the side walls 40 extend slightly angulated as illustrated in FIG. 7. Each of the slats 30 would be substantially the same length as the height of the frame 12, so that when the wall is positioned around frame 12, the slat would extend from the bottom to the top of the frame.

Further, there is illustrated a continuous flexible fabric portion 41, which has a first upper face 42, which the slat members 30 would be adhered to as illustrated in FIG. 2. This adherence would be accomplished through gluing or the like, and the slats would be positioned as seen in FIGS. 2 and 3, in substantially parallel relation, so as to form a continuous plurality of a slated wall 45, as seen in FIG. 2. After the slats have been adhered to the material 41, the second face of the material would then be positioned around the outer face of the frame 12 as illustrated in FIG. 1.

The assemblage of the wall portion around the frame 12 could be done quite easily due to the fact that the material 41 as stated earlier, is quite flexible. Since each of the slats 30 are positioned in parallel relation, and have the beveled side walls 40, this would enable the wall 45 to be flexible as opposed to being rigid, and would enable it to therefore wrap around the frame as illustrated in the Figures.

Figure 4:
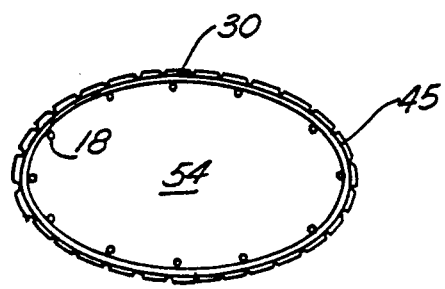
FIG. 4 illustrates a top view of an oval container such as a planter utilizing the present invention.

FIGS. 2 through 4, as illustrated in top view, simply illustrate different configurations of the frame upon which the flexible slated wall can be placed, which as seen in FIGS. 2 through 4 comprise square 50, rectangular 52, and oval 54 respectively. These are illustrated in top view to illustrate that the flexible wall 45 is able to be wrapped around the various configured frames 12, as seen in FIGS. 2 through 4, and therefore the assemblage can be completed despite the overall shape of the frame.

It would be foreseen that in order to be a marketable consumer item, that the frame could be shipped totally disassembled, with the necessary hardware and instructions in order to first assemble the frame in the configuration one has selected. The wall portion would come as a continuous layer as illustrated in FIG. 2, and depending on the type of frame the wall would simply be placed around the frame and adhere thereto via gluing or the like, and it could be closed off to form the continuous wall portion as illustrated in the FIGURES, and perhaps in other configurations that could accommodate that type of wall.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An assembly for containers comprising:
    a) a plurality of frame members engageable in order to form a framework for a container;
    b) a wall portion of the container, adhered to the outer face of the frame portion after the frame has been constructed, the wall portion further comprising:
        i) a continuous fabric layer of the width that is the height of the container frame;
        ii) a plurality of wooden slats, each of the slats being of the same height as the width of the fabric;
        iii) means for adhering each of the slats to the fabric in a substantial parallel relationship, so that the slats would form a continuous outer face of the wall after the slats have been adhered to the fabric; and
    e) means for adhering the fabric containing the plurality of slats to the outer surface of the frame, so that once completed the fabric housing the slats form a continuous decorative wall around the container frame to serve as a completed container.

2. The apparatus in claim 1, wherein the individual members of the frame would be interconnected via bolting.

3. The apparatus in claim 1, wherein the completed frames would be shaped in the configuration of a circle, rectangle, square, oval.

4. The apparatus in claim 1, wherein the slat members would be adhered to the fabric layer via gluing.

5. The apparatus in claim 1, wherein each of the slat members would have a broader base width than its upper width, so that the walls are beveled inwardly from the base width.

6. The apparatus in claim 1, wherein the fabric housing the individual slat members would form a flexible means for enclosing the framework following the construction of the framework.

7. The apparatus in claim 1, wherein the apparatus would function as a wall container for a plant.

* * * * *